June 11, 1929.  A. C. BECKMAN  1,717,305
CORN HARVESTER
Filed Dec. 15, 1926  2 Sheets-Sheet 1
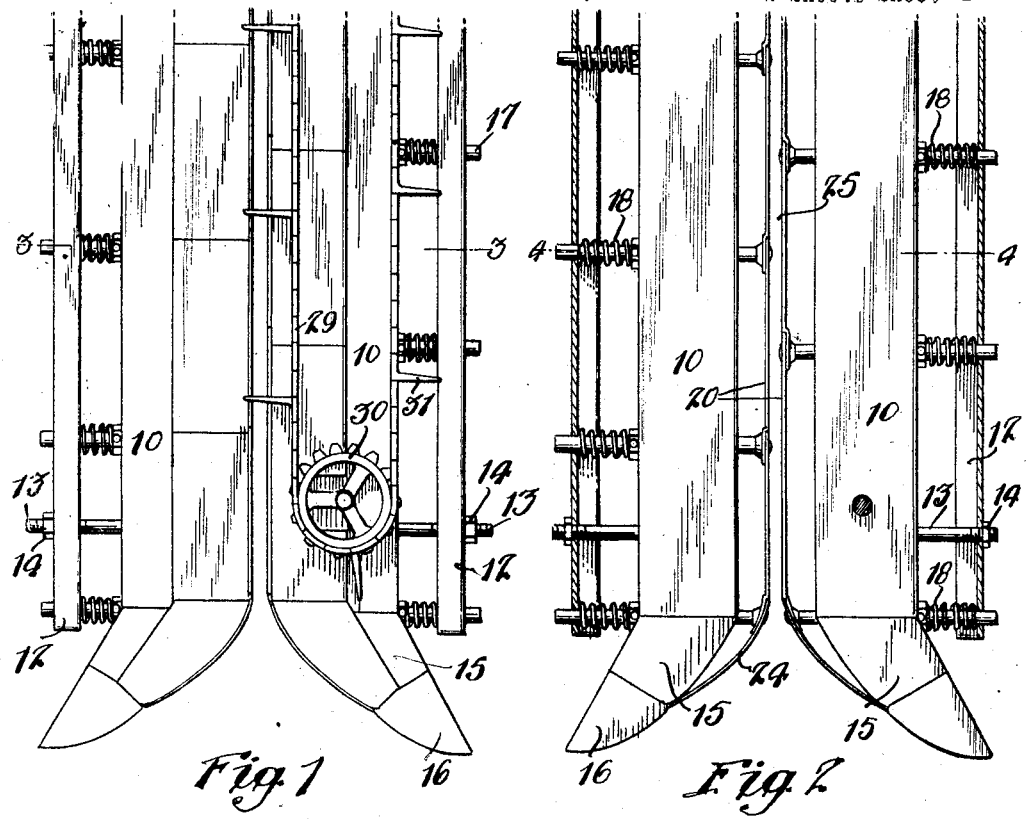
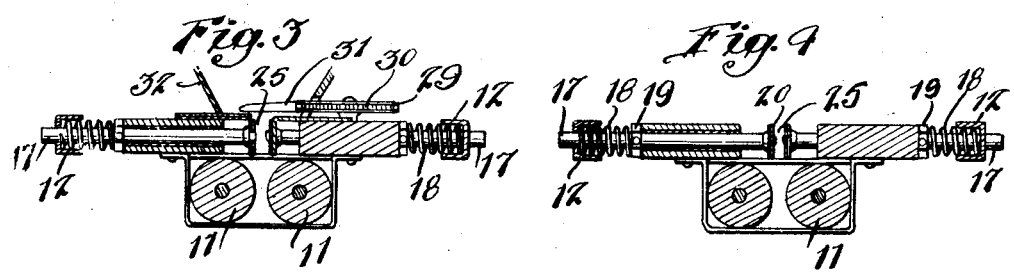
Arthur C. Beckman
Inventor June 11, 1929.  A. C. BECKMAN  1,717,305
CORN HARVESTER
Filed Dec. 15, 1926   2 Sheets-Sheet 2
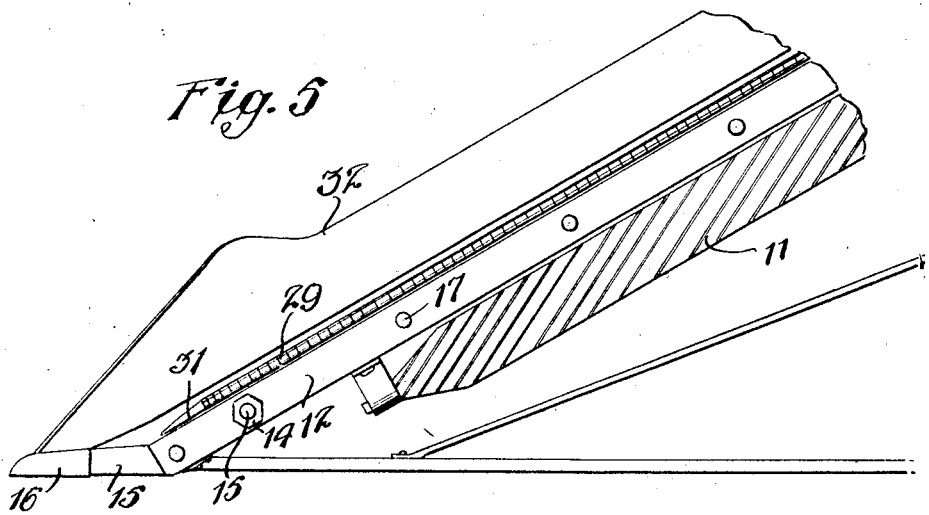
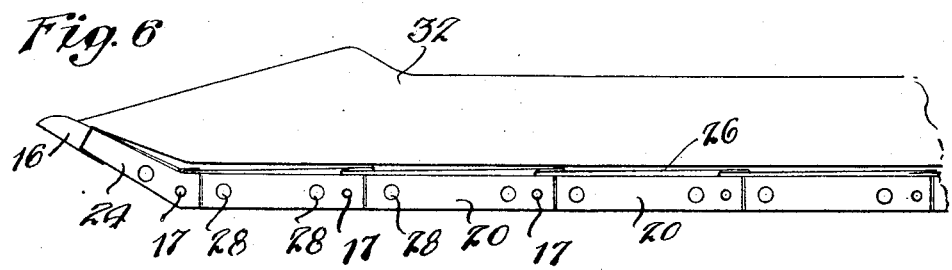
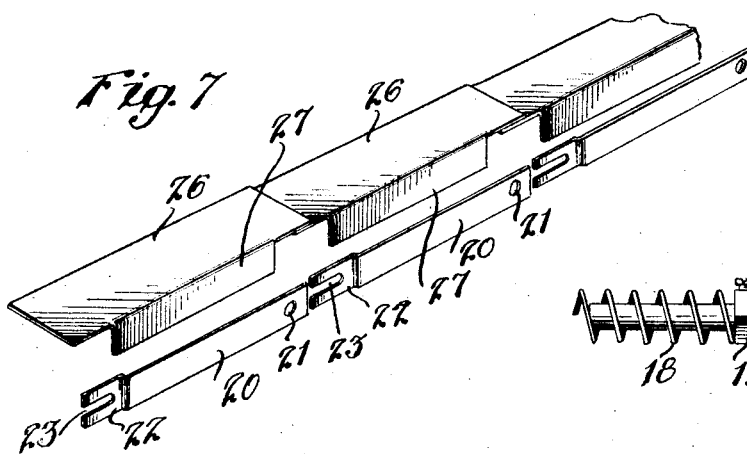
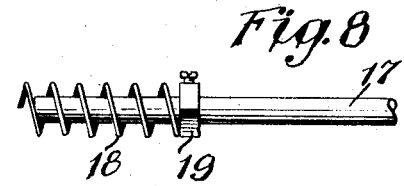
Arthur C. Beckman,
Inventor
his Attorney Patented June 11, 1929.

1,717,305

UNITED STATES PATENT OFFICE.

ARTHUR C. BECKMAN, OF MOUND CITY, SOUTH DAKOTA.

CORN HARVESTER.

Application filed December 15, 1926. Serial No. 154,984.

My invention relates to corn harvesters and more especially to snapping apparatus therefor.

An important object of my invention is to provide positive means for pulling the ears of corn from the stalk.

Another object of my invention is the provision of a device of the character described comprising means for adjustment to suit different varieties of corn.

A further object of my invention is the provision of a device of the above mentioned character with means for picking up low or bent corn.

Other objects and advantages of my invention will be apparent during the course of the following description.

In the accompanying drawings which form a part of this specification and wherein like characters of reference denote like or corresponding parts throughout the same, Figure 1 is a plan view of a portion of the planks and associated elements of a corn harvester made in accordance with my invention, Figure 2 is a similar view, parts being removed, Figure 3 is a transverse section on the line 3—3 of Figure 1, Figure 4 is a similar section taken on the line 4—4 of Figure 2, Figure 5 is a side elevation of the portion of the device shown in Figure 1, Figure 6 is a side elevation of one of the planks and its associated elements, removed from the harvester, Figure 7 is a detail perspective view of the snapping apparatus, and, Figure 8 is a detail view of one of the spring shafts, spring and adjusting collar.

In the drawings, wherein for the purpose of illustration is shown a preferred embodiment of my invention, the numeral 10 designates the spaced planks of a corn harvester which in accordance with the present invention are rigidly secured to the frame of the harvester with a substantial space between the two planks. The usual rolls 11 are mounted beneath the planks 10, one of said rolls being spring pressed as is usual, the rolls being arranged beneath the space between the planks. U-shaped bars 12 are spaced from the outer edges of the planks and secured thereto by means of bolts 13 which pass through the bars 12 and nuts 14 arranged outside of the bars and engaging the bolts, the open edges of the bars facing inwardly as shown. It will be seen that the space between the bars 12 and the planks may be varied by adjusting the nuts 14.

The front ends of the planks 10 are provided with diverging pick up points 15 which are arranged at an angle to the planks and are adapted to parallel the ground in close proximity thereto. These points form a flared mouth or throat at the front end of the space between the planks and being close to the ground, and parallel thereto, serve to pick up short and bent corn and guide it into the space between the planks. The ends of the points are preferably metal covered as shown at 16.

Transverse shafts 17 pass through the bars 12 and the planks 10 and extend into the space between the planks, from opposite sides of said space. Coil springs 18 are arranged on the shafts between the bars 12 and the planks 10 and bear against adjustable collars 19 on the shafts adjacent the planks. Snapping irons 20 are secured to the inner ends of the shafts 17 within the space between the planks and comprise a body portion, preferably of spring material, and having one end provided with an opening 21 to receive the reduced end of one of the shafts 17 which is rigidly secured therein. The other end of the body portion is provided with an offset portion 22 which is forked as shown at 23. In assembling, the apertured end of each of the snapping irons is placed against the offset portion of the adjacent snapping iron and the reduced end of the shaft 17 passes through the forked offset end of one snapping iron and is secured in the aperture 21 in the other snapping iron.

The snapping irons 24, arranged at the flared end of the opening between the planks, are curved outwardly and secured adjacent the ends of the pick up points, as by being passed under the metal covers 16. The snapping irons, when in place present a pair of straight smooth surfaces, which face each other to form a narrow channel or throat 25 which is flared outwardly at its lower front end as shown in Figures 1 and 2. It will be seen that these irons 23 form articulated walls to the throat 25, which may be forced outwardly against the tension of the springs 18 but which will be returned to their normal positions by the springs 18 when outward pressure is removed. The shafts 17 on opposite sides of the throat 25 are preferably arranged in staggered relation, as shown.

Cover plates 26 have downwardly extending flanges 27 which terminate short of the ends of the plates and which are adapted to be secured to the snapping irons 23 between the shafts 17 by means of rivets 28 or the like. The plates 26 extend outwardly from the irons 23 and are adapted to rest upon the planks 10 as shown in Figures 1 and 3 and serve to bridge and cover the space between the snapping irons 23 and the associated planks, leaving the throat clear. The adjacent ends of the plates 26 overlap, as seen in Figure 7, and the plates are adapted to slide over the planks when the snapping irons are pressed apart.

The usual chain 29 passes around the sprocket 30 and is provided with fingers 31 which extend over the throat 25. Guard pieces 32 are secured to the planks and flare upwardly as is usual.

In operation, the harvester is drawn along the row of corn and the stalks are guided into the throat by the irons 24 and moved therethrough by the fingers 31 on the chain 29. The rolls 11 pull the stalk downwardly through the throat and the ears are pulled from the stalks and carried upwardly by the fingers 31. The snapping irons are so regulated that the stalks can be pulled therethrough but the ears will remain above them. The throat may be adjusted for different sizes or types of corn by adjustable collars 19 on the shafts 17. If it is desired to increase the tension of the springs 18 it is only necessary to reduce the space between the bars 12 and planks by adjusting the nuts 14.

The cover plates 26 prevent anything from jamming between the snapping irons 23 and the planks 10.

While I have shown and described the preferred embodiment of my invention, it is to be understood that various changes in the size, shape and arrangement of parts may be resorted to without departing from the spirit of my invention or the scope of the subjoined claims.

Having thus described my invention what I claim and desire to protect by Letters Patent is:

1. A corn harvester having a pair of spaced planks, snapping members resiliently connected thereto and arranged therebetween, and rolls arranged below said snapping members and adapted to cooperate therewith to remove the ears of corn from the stalks.

2. A corn harvester having a pair of spaced planks, snapping members arranged between said planks to form a restricted throat, resilient means allowing spreading of said snapping members, and rolls arranged below said snapping members and adapted to cooperate therewith to remove the ears of corn from the stalks.

3. A corn harvester comprising a pair of spaced planks, snapping members arranged therebetween to form a restricted throat, means to vary the distance between the snapping members, resilient means allowing spreading of said snapping members, and means cooperating with the snapping members to draw the stalks therethrough to remove the ears from the stalks.

4. A corn harvester comprising a pair of spaced planks, snapping members arranged therebetween to form a restricted throat, means to vary the distance between the snapping members, resilient means allowing spreading of said snapping members, means to vary the tension of said resilient means, and means cooperating with the snapping members to pull the stalks therethrough to remove the ears from the stalks.

5. A corn harvester comprising a pair of spaced planks, snapping members arranged to form a restricted throat having a flared end to receive the incoming stalks, means to vary the normal distance between the snapping members, resilient means allowing the spreading of said snapping members, and rolls cooperating with the snapping members to remove the ears from the stalks.

6. A corn harvester comprising a pair of spaced planks, a restricted throat formed by two articulated series of snapping members arranged between the planks, resilient means allowing spreading of the snapping members to accommodate various sizes of stalks, and rolls cooperating with the snapping members to remove the ears from the stalks.

7. A corn harvester comprising a pair of spaced planks, an articulated series of snapping members arranged between the planks, shafts connecting said snapping members with one of the planks, said shafts being capable of transverse movement relative to the plank, resilient means resisting said transverse movement of the shafts, and rolls arranged below said snapping members and cooperating therewith.

8. A corn harvester comprising a pair of spaced planks, a bar arranged in spaced relation to one of said planks and secured thereto, an articulated series of snapping members arranged between said planks, shafts passing through the bar and associated plank and secured to the snapping member, said shafts being capable of transverse movement relative to the plank and bar, and springs arranged on said shafts between the bar and plank, and engaging the bar at one end and collars on the shaft at the other end to resist the transverse movement of the shafts.

9. A corn harvester comprising a pair of planks, a bar arranged in spaced relation to one of the planks and secured thereto, an articulated series of snapping members arranged between said planks, shafts secured to said snapping members and passing through the bar and associated plank, springs arranged on said shafts between the bar and the plank, collars secured to the shafts adjacent the plank to be engaged by the springs, means to vary the distance between the bar and the plank to vary the tension of the springs, and means allowing adjustment of the collars on the shafts to vary the distance between the snapping members and the plank.

10. A corn harvester comprising a pair of planks, an articulated series of snapping members arranged between the planks and resiliently connected with one of the planks and capable of transverse movement with respect thereto, and cover plates secured to the snapping members and extending over the space between said snapping members and their associated planks, said cover members being capable of sliding movement with respect to the plank.

In testimony whereof I affix my signature.

ARTHUR C. BECKMAN.